United States Patent
Davel

(10) Patent No.: US 9,180,520 B2
(45) Date of Patent: Nov. 10, 2015

(54) METHOD OF PROCESSING A COMPOSITE BODY

(71) Applicant: ELEMENT SIX ABRASIVES S.A., Luxembourg (LU)

(72) Inventor: Jacobus Stephanus Davel, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 14/350,139

(22) PCT Filed: Oct. 5, 2012

(86) PCT No.: PCT/EP2012/069788
§ 371 (c)(1),
(2) Date: Apr. 7, 2014

(87) PCT Pub. No.: WO2013/050571
PCT Pub. Date: Apr. 11, 2013

(65) Prior Publication Data
US 2014/0230339 A1    Aug. 21, 2014

Related U.S. Application Data

(60) Provisional application No. 61/545,001, filed on Oct. 7, 2011.

(30) Foreign Application Priority Data

Oct. 7, 2011    (GB) .................................. 1117335.8

(51) Int. Cl.
*B22F 7/06*     (2006.01)
*C23F 1/10*     (2006.01)
(Continued)

(52) U.S. Cl.
CPC . *B22F 7/06* (2013.01); *C04B 37/00* (2013.01); *C04B 41/00* (2013.01); *C23F 1/10* (2013.01)

(58) Field of Classification Search
CPC ........... B22F 7/06; C04B 37/00; C04B 41/00; C23F 1/10; B24D 3/00; B24D 10/00
See application file for complete search history.

(56) References Cited

U.S. PATENT DOCUMENTS 3,887,680 A * 6/1975 MacInnis et al. ................ 423/55
4,224,380 A * 9/1980 Bovenkerk et al. ........... 428/545
(Continued)

FOREIGN PATENT DOCUMENTS

EP     0439017 A1    7/1991
EP     0518591 A1    12/1992
(Continued)

OTHER PUBLICATIONS

United Kingdom Application No. 1117335.8, Combined Search and Examination Report mailed on Feb. 13, 2012, 6 pages.
(Continued)

*Primary Examiner* — Pegah Parvini
*Assistant Examiner* — Alexandra M Moore
(74) *Attorney, Agent, or Firm* — Dean W. Russell; Clark F. Weight; Kilpatrick Townsend & Stockton LLP

(57) ABSTRACT

A method of processing a composite body comprising a super-hard structure and refractory metal material exposed proximate a boundary of the composite body, the refractory metal material comprising refractory metal. The method includes providing a basic corrosive agent, heating the corrosive agent to at least its melting point, contacting the composite body with the corrosive agent in the molten state and treating the composite body with the corrosive agent for a period of time to remove refractory metal material from the composite body.

16 Claims, 1 Drawing Sheet

Figure 1:
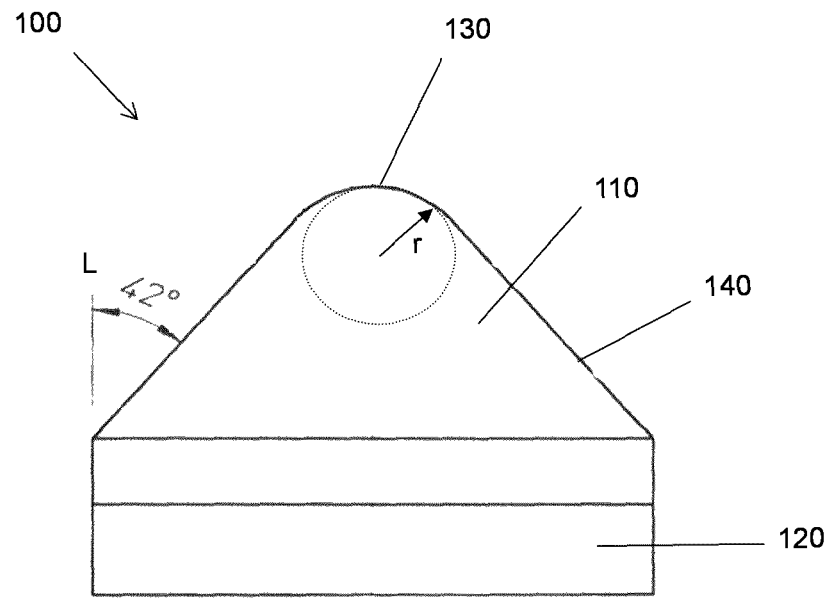

(51) Int. Cl.
  *C04B 37/00* (2006.01)
  *C04B 41/00* (2006.01)

(56) References Cited

U.S. PATENT DOCUMENTS

| | | | |
|---|---|---|---|
| 4,629,503 A | | 12/1986 | Fruchter et al. |
| 4,810,447 A | * | 3/1989 | Csillag ............... 264/125 |
| 5,127,923 A | * | 7/1992 | Bunting et al. ......... 51/293 |
| 5,173,612 A | | 12/1992 | Imai et al. |
| 6,120,570 A | | 9/2000 | Packer et al. |
| 2005/0220690 A1 | | 10/2005 | Ohtsubo |
| 2010/0095602 A1 | * | 4/2010 | Belnap et al. ......... 51/309 |

FOREIGN PATENT DOCUMENTS

| | | |
|---|---|---|
| EP | 0578605 A1 * | 1/1994 |
| JP | H07155884 A | 6/1995 |

OTHER PUBLICATIONS

United Kingdom Application No. 1217876.0, Combined Search and Examination Report mailed on Oct. 19, 2012, 6 pages.
International Application No. PCT/EP2012/069788, International Search Report mailed on Feb. 8, 2013, 3 pages.

* cited by examiner

METHOD OF PROCESSING A COMPOSITE BODY

CROSS REFERENCE TO RELATED APPLICATIONS

This application is the U.S. national phase of International Application No. PCT/EP2012/069788 filed on Oct. 5, 2012, and published in English on Apr. 11, 2013 as International Publication No. WO 2013/050571 A1, which application claims priority to Great Britain Patent Application No. 1117335.8 filed on Oct. 7, 2011 and U.S. Provisional Application No. 61/545,001 filed on Oct. 7, 2011, the contents of all of which are incorporated herein by reference.

This disclosure relates generally to a method of processing a composite body comprising refractory metal material and a super-hard structure, particularly but not exclusively to removing refractory metal from a sintered polycrystalline structure comprising super-hard grains.

As used herein, super-hard material has a Vickers hardness of at least about 28 GPa and examples of super-hard material include diamond, cubic boron nitride (cBN) and certain materials comprising diamond or cBN, such as polycrystalline diamond (PCD) and polycrystalline cBN (PCBN) material.

U.S. Pat. No. 3,745,623 discloses a method for sintering polycrystalline diamond (PCD) material within a protective metal sheath, which remains strongly affixed to the outer surfaces of the PCD body after sintering and which can be removed by simply grinding it away. The metal sheath may comprise titanium or zirconium. Since some of the protective sheath is converted to carbide and instead grinding away all of the material, a thin outer layer of carbide material can be left.

Japanese patent application no. 59-219500 discloses that removal of metal catalyst material from a region of a PCD tool insert, the region extending at least about 200 microns from a working surface, will improve the heat resistance of the material and may improve the performance of the insert in use. U.S. Pat. No. 6,861,137 discloses that the removal of binder-catalyst material from a portion of the interstitial matrix of a polycrystalline diamond body, adjacent to a working surface, but not from the remaining interstitial matrix may improve its wear resistance without loss of impact strength.

United States patent application publication number 2010/0012391 describes a polycrystalline diamond compact cutter having a body of diamond crystals, containing cobalt in the interstitial regions, which is coated with Teflon. Segments of the dried Teflon coating is removed before the body is leached with a mixture of hydrochloric acid and hydrofluoric acid. United States patent application publication number 2010/0095602 teaches a method for making a thermally stable cutting element by leaching metal material from the interstitial regions of a sintered diamond body with and acid mixture containing two different acid species. The acid mixture contains an acid solution and at least one acid forming compound.

There is a need for an effective method for removing refractory metal material from a composite body comprising super-hard material, particularly but not exclusively in which the composite body comprises polycrystalline super-hard material formed in the presence of refractory metal.

There is provided a method of processing a composite body comprising a super-hard structure and refractory metal material exposed proximate a boundary of the composite body, for example proximate a boundary of the super-hard structure; the method including providing a basic corrosive agent, heating the corrosive agent to at least its melting point, contacting the composite body with the corrosive agent in the molten state and treating the composite body with the corrosive agent for a period of time to remove refractory metal material from the composite body.

Various combinations and arrangements are envisaged by this disclosure for the method, the corrosive agent and the composite body, non-limiting and non-exhaustive examples are described below.

The corrosive agent may comprise one or more caustic or alkali material such as sodium hydroxide (NaOH), potassium hydroxide (KOH) or lithium hydroxide, corrosive salt of an alkali metal such as lithium, sodium, potassium, or alkali metal in the metallic form (e.g. elemental sodium) or a hydride of alkali and alkaline earth metal, such as sodium hydride (NaH). In some examples, the corrosive agent may comprise a mixture including one or more of these materials. In some examples, the corrosive agent may be provided in combination with water, for example the corrosive agent may comprise caustic or alkali material in the solid state incorporating water of crystallisation, and or the method may include combining caustic material with water. For example, the corrosive agent may be in solid form containing at least 5 weight per cent and at most 30 weight per cent water. Where a corrosive agent such as corrosive salt of an alkali metal is used, its purity may be at least about 70 per cent by weight or at least about 82 per cent and at most about 90 per cent or at most about 88 per cent by weight, and in one example the purity of the salt may be about 85 per cent by weight and the salt may be potassium hydroxide. For example, the purity of the corrosive agent may be at least about 70 per cent and at most about 90 per cent by weight. In some examples, the balance may comprise or consist of water.

In some examples, the corrosive agent may comprise potassium hydroxide in combination with water, in which the relative amounts of the potassium hydroxide and water are such that the corrosive agent can be put into a molten condition at a temperature of at most about 300 degree Celsius or at most about 250 degrees Celsius. For example, the corrosive agent may be provided in a form such that it will be molten at a temperature of at most about 240 degrees Celsius, which may be achieved by combining more than one caustic or alkali material and or providing a caustic or alkali material in combination with water, such as water of crystallisation or added water.

The basic corrosive agent may be capable of degrading the refractory metal in elemental form but substantially less capable or substantially incapable of degrading carbide of the refractory metal.

In some examples the period of time may be at least about 5 minutes, at least about 10 minutes or at least about 15 minutes, and in some examples the period of time may be at most about 180 minutes, at most about 90 minutes or at most about 45 minutes. In one example, the period of time may be about 30 minutes.

In some examples, the super-hard structure may comprise or consist of natural or synthetic diamond material or cubic boron nitride (cBN) material, and or the super-hard structure may comprise a plurality of grains of diamond or cBN material, such as polycrystalline diamond (PCD) or polycrystalline cBN (PCBN) material. In some examples, the super-hard structure may comprise polycrystalline diamond (PCD) material including catalyst material for diamond between diamond grains (the super-hard structure may comprise PCD material with relatively low thermal stability).

In various examples, the super-hard structure may be formed in a jacket and or in contact with a structure comprising the refractory metal; the refractory metal may be in elemental form or included in an alloy or compound, and may comprise one or more of tungsten, molybdenum, vanadium, zirconium, niobium, hafnium, titanium, chromium or tantalum.

The composite body may comprise a layer joined at a boundary to the super-hard structure, which may comprise PCD material, the layer comprising an inner sub-layer and an outer sub-layer, the outer sub-layer comprising the refractory metal material and the inner sub-layer comprising carbide of the refractory metal, in which the inner sub-layer is disposed between the outer sub-layer and the super-hard structure.

In some example arrangements, the composite body may comprise a super-hard structure having a boundary that includes a generally dome-shaped, bullet-shaped, conical, frusto-conical or cylindrical surface area. In some examples, the refractory metal material may be joined to a boundary of the super-hard structure via a layer comprising carbide of the refractory metal, the boundary of the super-hard structure defining a non-planar shape. For example, the super-hard structure may have a boundary defining a substantially non-planar shape, which may include a dome or cone surface.

In some examples, the super-hard structure may be for a drill insert, pick tool or other attack tool for degrading or shaping bodies or formations.

The method envisaged by this disclosure may include one or more additional acts, such as rinsing the treated super-hard body with a solvent such as water; and or mechanically removing a metal carbide layer from the super-hard structure, such as by means of sand blasting.

In some examples, the composite body may comprise a super-hard structure comprising PCD material defining a non-planar boundary (for example, a generally convex or concave boundary), a layer comprising the carbide of the refractory metal bonded to the PCD material at the boundary of the super-hard structure, and a layer comprising the refractory metal material joined to the layer of carbide material, in which refractory metal material is exposed at a boundary of the composite body; the corrosive agent comprising potassium hydroxide provided in combination with water. In some examples, the refractory metal may comprise at least one of niobium or tantalum; and the relative amounts of the potassium hydroxide and water are such that the corrosive agent can be put into a molten condition at a temperature of at most about 300 degree Celsius or at most about 250 degrees Celsius.

In some examples, the method may include treating the composite body with the corrosive agent for a period of time sufficient to remove substantially all of the refractory metal material and removing carbide of the refractory metal by means of sand blasting. In some examples, the boundary of the super-hard structure, which may comprise PCD material including catalyst material for diamond in interstices between the diamond grains comprised therein, may thus be exposed.

Figure 2:
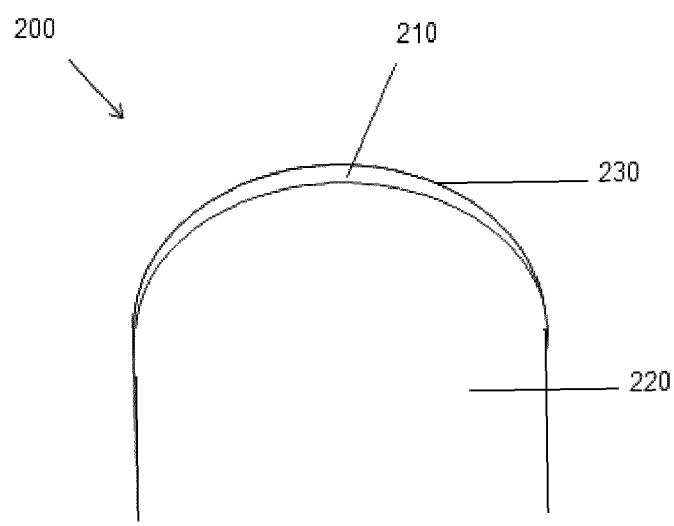

Non-limiting examples of the method of treating a super-hard structure will now be described in more detail, with reference to the accompanying figures of which FIG. 1 shows a schematic side view of an example tip for a pick tool; and FIG. 2 shows a schematic longitudinal cross section view of an example domed shaped insert for an earth boring bit.

With reference to FIG. 1, an example tip 100 for a pick tool (not shown) comprises an impact structure 110 comprising polycrystalline diamond material joined to a proximate end of a substrate 120 comprising cemented carbide material. The impact structure 110 comprises a rounded (i.e. blunted) apex 130 and defines a working surface 140, the apex 130 having a radius of curvature r in a longitudinal plane parallel to a longitudinal axis L. The radius of curvature r may be from about 2.1 millimetres to about 2.3 millimetres. The conical part of the working surface 140 may be inclined at an angle of about 42 degrees with respect to the longitudinal axis L.

In one example, a composite body comprising the PCD structure joined to a cemented carbide substrate may be for a pick tool tip for a road milling apparatus, generally as disclosed in United States patent application publication number 2010/0065338. Various arrangements and combinations of features are envisaged. The pick tool tip may comprise a polycrystalline diamond structure joined to a cemented carbide substrate at a non-planar interface, in which the polycrystalline diamond structure may have a working end having the general shape of a rounded cone with an apex having a 1.3 millimetres to 3.2 millimetres radius of curvature, longitudinally (i.e. in a plane through the apex). The polycrystalline diamond structure may have a 2.5 millimetres to 12 millimetres thickness from the apex to the interface between the polycrystalline diamond structure and the cemented carbide substrate. The polycrystalline diamond structure may have a side which forms a 35 to 55 degree angle with a central longitudinal axis of the tip. The angle may be substantially 45 degrees. The polycrystalline diamond structure may have a volume in the range from 75 to 150 per cent of the volume of the carbide substrate. An example polycrystalline diamond material may comprise diamond grains (as sintered) having a mean size of at least about 10 microns and at most about 80 microns.

With reference to FIG. 2, an example insert 200 for a drill bit (not shown) comprises a layer 210 of polycrystalline diamond material joined to a cemented carbide substrate 220. The polycrystalline diamond layer 210 defines a generally domed working surface 230. The polycrystalline diamond layer 210 may be about 2.2 millimetres thick (at least on a central axis of the insert) and the diamond content of the polycrystalline diamond layer may be about 92 per cent by volume, the balance being cobalt and minor precipitated phases such as tungsten carbide.

Example methods of making an insert or tip comprising a PCD impact structure joined to a cemented carbide substrate will be described. A PCD structure formed within a refractory metal jacket at high-pressure and high-temperature conditions can be provided. The PCD may be formed in the presence of a catalyst/solvent material for diamond, such as Co, Ni, Fe, or alloys thereof by subjecting an aggregation of a plurality of diamond grains to an ultra-high pressure and a high temperature at which the catalyst/solvent material is molten. For example, the pressure may be at least about 55 kilobar and the temperature may be at least about 1400 degrees Celsius. At least a part of the jacket may react with carbon from the diamond and bond to the PCD structure at a boundary of the PCD structure via an inner sub-layer comprising carbide of the refractory metal. Some of the refractory metal is likely to have diffused into a region of the PCD structure.

In one example, an aggregation comprising a plurality of diamond grains can be placed on a surface of a cemented carbide substrate including cobalt binder, and the aggregation and the substrate may be encapsulated within a jacket comprising molybdenum to form a pre-sinter assembly. Part of the aggregation will be in contact with or at least proximate the jacket. The pre-sinter assembly can be subjected to a pressure of at least about 55 kilobar and a temperature of at least about 1,400 degrees Celsius for sufficient time for the cobalt binder to melt and infiltrate from the substrate into the aggregation and for the diamond grains to sinter to each other to form a PCD structure joined to the substrate. The resulting PCD structure will likely comprise a network of directly inter-bonded diamond grains and a network of interstices between the diamond grains containing catalyst/solvent material. A boundary of the PCD structure corresponding generally to the part of the aggregation in contact with the jacket will be joined to a residual layer of material containing molybdenum from the jacket. The layer is likely to comprise an inner sub-layer comprising molybdenum carbide and an outer layer comprising molybdenum in elemental form.

In another example, the jacket may comprise niobium, a boundary of the sintered PCD structure may be joined to a residual layer of material containing niobium from the jacket, the layer is likely to comprise an inner sub-layer comprising niobium carbide and an outer layer comprising niobium in elemental form.

In some examples, a substrate having substantially cylindrical side surface connecting a proximate end and a distal end may be provided. An aggregation comprising a plurality of diamond grains may be provided, and may be substantially mono-modal or multi-modal. The aggregation may comprise substantially loose diamond grains or diamond-containing pre-cursor structures such as granules, discs, wafers or sheets. The aggregation may also include catalyst material for diamond or pre-cursor material for catalyst material, which may be admixed with the diamond grains and or deposited on the surfaces of the diamond grains. The aggregation may contain additives for reducing abnormal diamond grain growth or the aggregation may be substantially free of catalyst material or additives. Alternatively or additionally, another source of catalyst material such as cobalt may be provided, such as the binder material in the cemented carbide substrate.

In some example methods, the polycrystalline diamond element may be made using an ultra-high pressure sintering method in which catalysing material is allowed to infiltrate into an un-bonded, or at least a weakly bonded, porous aggregation comprising a plurality diamond grains, and to fill substantially all of the pores or interstitial regions. The aggregation may comprise diamond grains having a multimodal size distribution in which the mean size of the diamond grains within the sintered product is in the range from about 15 to about 20 microns and the size distribution can be resolved into at least three distinct peaks. The aggregation may be prepared by blending diamond powders having different average sizes, at least about 70 weight per cent of the grains having an average grain size greater than 10 microns.

The diamond grains within the polycrystalline diamond body thus produced may have a multimodal size distribution having the characteristic that about 35 weight per cent of the grains have a mean size of less than 5 microns, about 40 weight per cent of the grains have a mean size in the range from 5 microns to 10 microns, and about 25 weight per cent of the grains have a mean size greater than 10 microns. The grain size distribution of the sintered polycrystalline diamond body is likely to be different from that of the input grains due to mutual crushing of the grains at high pressure, in addition to the shift towards coarser grain sizes that normally occurs during the sintering process.

In some examples, a pick tool tip or drill bit insert may be formed by placing an aggregation of diamond grains onto a cemented carbide substrate, such as a cobalt-cemented tungsten carbide substrate, the aggregation and the substrate being contained within a niobium containing metal jacket to form a pre-sinter assembly. A number of these metal jacketed pre-sinter assemblies may then be placed in an ultra-high pressure press and sintered in the presence of a metallic catalyst/solvent that facilitates the diamond-to-diamond bonding to form respective PCD structures. During the sintering process, niobium from the metal jacket will react with the carbon from the diamond to form a layer of metal carbide bonded to the PCD structure at a boundary of the PCD structure.

For certain industrial applications such as road milling, mining and percussion drilling, it may be beneficial to remove at least part of the residual layer but not to remove catalyst/solvent material from the PCD structure.

In some examples, a composite body comprising a PCD structure formed joined (in other words, the PCD structure became joined to the substrate in substantially in the same process in which the PCD structure was formed) to a cemented carbide substrate and a layer comprising refractory metal from the jacket can be provided using the described methods or other methods. In versions of the method in which the aggregation and the substrate are substantially entirely encapsulated within the jacket, substantially no surface of the PCD structure or the substrate is likely to be exposed, and substantially the whole surface of the PCD structure and substrate likely being covered by the layer. The layer will likely comprise an inner sub-layer comprising carbide of the refractory metal resulting from reaction of the jacket material with carbon from the aggregation of diamond grains, and an outer sub-layer comprising substantially non-carbide refractory metal material. According to the disclosed method, at least part of the exposed outer sub-layer may be removed by treatment with a basic corrosive agent. The carbide inner sub-layer may be substantially resistant to the basic corrosive agent and is likely to remain substantially intact on the surface of the PCD structure and the substrate, in effect protecting these from degradation by the corrosive agent. Thus binder material in the PCD structure and or the substrate is unlikely to be substantially leached out. The inner sub-layer may subsequently be removed by a mechanical method or it may be left intact to form part of the end product.

In order to remove at least some of the outer sub-layer, the PCD body may be immersed in a corrosive salt of an alkali earth metal. A corrosive salt bath may be prepared by melting potassium hydroxide pellets, having purity of about 85 per cent by weight (most of the balance being water), at a temperature at which it is molten. The molten potassium hydroxide may be controlled at this temperature for the duration of this step of the treatment process by means of a thermostat control of a hot plate. The polycrystalline diamond body may be immersed in the molten salt bath for a period of between about 30 minutes and about 90 minutes. The period of immersion is determined, amongst other things, by the relative size of the polycrystalline diamond body to be treated. The molten potassium hydroxide removes residual refractory metal (which in this particular example is residual niobium metal) from the polycrystalline diamond body while the metal carbide layer (in this case niobium carbide) is inert to the corrosive salt, and thus remains substantially intact.

In some examples, the treated body may then rinsed with water before being subjected to a sand blasting step to remove the carbide (for example, niobium carbide) layer from the polycrystalline diamond body. For example, the polycrystalline diamond body may be subjected to sandblasting for a period of about 15 minutes to remove the outer layer of niobium carbide. To the extent that there remains some residual refractory metal adhered on the carbide inner sub-layer, a longer sand blasting period may be needed. Sand blasting appears to remove relatively brittle material such as refractory metal carbide more rapidly than it does elemental metal.

In a particular non-limiting example, a precursor body for a PCD strike tip for a pick tool or drill bit may be provided by sintering together a plurality of diamond grains in the presence of cobalt at an ultra-high pressure of about 5.5 gigapascals and a temperature of about 1,300 degrees Celsius. The PCD material may have been formed by containing an aggregation of diamond grains between a cemented carbide substrate and a jacket or canister comprising niobium to provide a pre-sinter assembly, and subjecting the pre-sinter assembly to the ultra-high pressure and the temperature. Consequently, the pre-cursor body may comprise a layer of niobium carbide bonded to a boundary of the PCD structure, the substrate being bonded to the PCD structure at an interface opposite the boundary. The layer of niobium carbide will likely form as a result of chemical reaction between the niobium comprised in the jacket and the diamond grains comprised in the aggregation (and subsequently the PCD material). A layer comprising niobium in non-carbide (for example elemental or alloy form) will likely be joined to the layer of niobium carbide and be exposed at an outer boundary of the precursor body. Pellets or granules comprising potassium hydroxide and water may be provided, in which the potassium hydroxide is at least about 85 weight per cent and at most about 95 weight per cent of the pellets and the water is in the range of about 10 weight per cent to about 15 weight per cent of the pellets. The pellets may be placed into a crucible or tray on a hot plate and heated to a temperature of about 240 degrees Celsius (although the pellets are likely to melt in the range of about 210 degrees Celsius to about 220 degrees Celsius, the temperature may be maintained at a temperature in the range of about 20 to 30 degrees Celsius higher than the melting temperature to ensure that the salt remains in the molten state). The precursor body is immersed in the molten salt such that the exposed layer of niobium is treated for a sufficient period to remove substantially all of the niobium in elemental or alloy form, exposing the layer comprising the niobium carbide. The period will likely be at least about 10 minutes, and a period of less than about 60 minutes may be sufficient, depending on the thickness of the exposed layer to be removed. The quantity of pellets (and hence the amount of molten salt) required will depend on the amount of metal material to be removed and the desired rate of removal. It is likely that a mass ratio of potassium hydroxide to niobium (or other refractory metal such as tantalum or molybdenum, in other examples) of at most about 2:1 may be sufficient. The niobium carbide layer may have a thickness in the range of about 40 microns to about 80 microns and will likely be substantially resistant to removal by the potassium hydroxide, and may removed by means of sand blasting to expose the underlying boundary surface of the PCD structure.

While wishing not to be bound by a particular theory, at least one chemical reaction between potassium hydroxide and the niobium in the example described above may occur, involving the formation of $K_3NbO_4$, which is soluble in water.

PCD material may comprise filler material in interstices between the diamond grains and the filler material may comprise catalyst material used to sinter the PCD material. In certain industrial applications it may be desirable not to remove the metallic catalyst/solvent material from the interstitial spaces of a PCD or other super-hard body. These industrial applications include, but are not necessarily limited to, road milling, mining and percussion drilling. It may therefore be desirable to remove residual refractory metal, refractory metal carbide or other by-products of the manufacturing process from the super-hard body without substantial removal of material from the super-hard body. Residual refractory metal, refractory metal carbide and or other reaction products may be removed by treatment in acid mixture hydrofluoric acid and or nitric acid, for example. However, the aggressive nature of such treatment can be problematic where it is required that residual refractory metal be removed without substantially leaching material from the super-hard body. This problem could be at least partially overcome by prematurely removing the super-hard body from the leaching solution or mixture and then subjecting it to a process of sand-blasting or another mechanical process to remove any residual refractory material. However, this may result in uneven removal of refractory material and the process may be difficult to control.

The disclosed method is likely to reduce substantially the risk of removing filler material from the super-hard structure since a thin layer of metal carbide is likely to provide protection. The time required for removing the carbide layer by sand-blasting for example is likely to be reduced since the remaining carbide layer is more likely to be relatively uniform at relatively little of the refractory metal in non-compound form will be likely to remain. Health risks such as those that may arise from working with strong acids may also be reduced.

In examples where the refractory metal material is relatively malleable, it may be difficult to remove it from the composite body by mechanical means such as sand or shot blasting. Where the composite body comprises a layer of the refractory material connected to the super-hard structure via a layer of carbide of the refractory metal, it is likely to be effective to remove the refractory material by means of the disclosed treatment and, if desired, to remove the carbide layer by mechanical means since the carbide of the refractory metal is likely to substantially more brittle than the refractory metal material.

If the purity of the corrosive agent is too low then the process may be too slow and if the purity is too high then the process may be difficult to control or the melting point may be too high. Particularly (but not exclusively) in examples where the composite body comprises PCD material containing catalyst material between the diamond grains, it may be desired to avoid heating the PCD material substantially above about 300 or 400 degrees Celsius in order to reduce the risk of thermal degradation of the PCD material. The presence of water in combination with the caustic or alkali material may have the effect of reducing the temperature at which the corrosive agent can be put into the molten state. For example, the melting point of pure potassium hydroxide at sea level is about 380 degrees Celsius but it appears to melt at less than about 220 degrees Celsius when provided at a purity of about 85 per cent by weight and a higher altitude. In some circumstances it may be desirable to heat the corrosive agent to as low a temperature as possible in order better to control the process and for health and safety reasons As used herein, polycrystalline diamond (PCD) material comprises a mass (an aggregation of a plurality) of diamond grains, a substantial portion of which are directly inter-bonded with each other and in which the content of diamond is at least about 80 volume per cent of the material. Interstices between the diamond grains may be at least partly filled with a binder material comprising a catalyst material for synthetic diamond, or they may be substantially empty. Catalyst material (which may also be referred to as solvent/catalyst material or catalyst/solvent material) for synthetic diamond is capable of promoting the growth of synthetic diamond grains and or the direct inter-growth of synthetic or natural diamond grains at a temperature and pressure at which synthetic or natural diamond is thermodynamically more stable than graphite. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains.

As used herein, a refractory metal is understood to have a melting point above 2,000 degrees Celsius, good elevated temperature strength and mechanical stability.

The invention claimed is:

1. A method of processing a composite body, the method including:
   providing the composite body, comprising:
   polycrystalline diamond (PCD) material including catalyst material for diamond, disposed between diamond grains, and refractory metal material exposed proximate a boundary of the composite body, in which
   the refractory metal material comprises refractory metal and is joined to a boundary of the PCD material via a layer comprising carbide of the refractory metal;
   providing a basic corrosive agent
   in a solid state,
   containing water, and
   having purity of 70 to 90 per cent by weight,
   such that it will be molten at a temperature of at most 300 degrees Celsius;
   heating the corrosive agent to at least its melting point,
   contacting the composite body with the corrosive agent in the molten state and treating the composite body with the corrosive agent for a period of time to remove refractory metal material from the composite body, such that the refractory metal carbide layer remains intact joined to the boundary of the PCD material and protects the catalyst material from being leached out.

2. A method as claimed in claim 1, in which the corrosive agent comprises one or more salt of a metal selected from the group consisting of lithium, sodium, or potassium.

3. A method as claimed in claim 1, in which the corrosive agent comprises sodium hydroxide.

4. A method as claimed in claim 1, in which the corrosive agent comprises potassium hydroxide.

5. A method as claimed in claim 1, in which the corrosive agent comprises lithium hydroxide.

6. A method as claimed in claim 1, wherein the corrosive agent contains 5 to 30 mass per cent water.

7. A method as claimed in claim 1, in which the time period is at least 5 minutes.

8. A method as claimed in claim 1, in which the refractory metal is selected from the group consisting of tungsten, molybdenum, niobium, hafnium, or tantalum.

9. A method as claimed in claim 1, in which the PCD material is formed in contact with a structure comprising the refractory metal.

10. A method as claimed in claim 1, in which the PCD material is formed in contact with a jacket comprising the refractory metal.

11. A method as claimed in claim 1, wherein the boundary of the PCD material defines a non-planar shape.

12. A method as claimed in claim 11, in which the non-planar shape includes a dome or cone surface.

13. A method as claimed in claim 1, in which the super-hard structure is for a drill insert, pick tool or other attack tool.

14. A method as claimed in claim 1, including the step of rinsing the treated super-hard structure with water.

15. A method as claimed in claim 1, including mechanically removing a refractory metal carbide layer from the PCD material.

16. A method as claimed in claim 15, including removing the refractory metal carbide layer from the PCD material by sand blasting or grinding.

* * * * *